(12) United States Patent
Nagashima et al.

(10) Patent No.: US 7,896,544 B2
(45) Date of Patent: Mar. 1, 2011

(54) HEAT DETECTOR AND METHOD OF MANUFACTURING HEAT DETECTING ELEMENT

(75) Inventors: Tetsuya Nagashima, Tokyo (JP); Manabu Dohi, Tokyo (JP); Yoshimi Kawabata, Tokyo (JP); Yasuo Ohmori, Tokyo (JP)

(73) Assignee: Hochiki Corporation, Tokyo (JP)

( * ) Notice: Subject to any disclaimer, the term of this patent is extended or adjusted under 35 U.S.C. 154(b) by 374 days.

(21) Appl. No.: 11/815,641

(22) PCT Filed: Feb. 3, 2006

(86) PCT No.: PCT/JP2006/301880
§ 371 (c)(1),
(2), (4) Date: Nov. 5, 2007

(87) PCT Pub. No.: WO2006/082930
PCT Pub. Date: Aug. 10, 2006

(65) Prior Publication Data
US 2009/0010303 A1    Jan. 8, 2009

(30) Foreign Application Priority Data
Feb. 7, 2005   (JP) .............................. 2005-030981
Mar. 3, 2005   (JP) .............................. 2005-059248

(51) Int. Cl.
*G01K 7/00*       (2006.01)
(52) U.S. Cl. .......................................... 374/176; 374/43
(58) Field of Classification Search .................. 374/16, 374/43, 176
See application file for complete search history.

(56) References Cited

U.S. PATENT DOCUMENTS

| | | | |
|---|---|---|---|
| 4,445,109 A | | 4/1984 | Naganoma et al. |
| 5,274,727 A | | 12/1993 | Ito et al. |
| 5,425,582 A | | 6/1995 | Asano et al. |
| 5,652,674 A | * | 7/1997 | Mizuuchi et al. ............ 359/326 |
| 5,793,025 A | | 8/1998 | Niimi et al. |
| 5,900,223 A | * | 5/1999 | Matijevic et al. ............ 423/263 |
| 2002/0004160 A1 | * | 1/2002 | Shimada et al. ............... 429/62 |
| 2004/0214723 A1 | * | 10/2004 | Nonoyama et al. .......... 505/100 |
| 2006/0006360 A1 | * | 1/2006 | Takao et al. ............. 252/62.9 R |

(Continued)

FOREIGN PATENT DOCUMENTS

JP          49-24399        3/1974

(Continued)

OTHER PUBLICATIONS

Wikipedia, definition of Perovskit Structure.*

(Continued)

*Primary Examiner*—Lisa M Caputo
*Assistant Examiner*—Mirellys Jagan
(74) *Attorney, Agent, or Firm*—Sherr & Vaughn, PLLC

(57) ABSTRACT

To provide a heat detector in which thermal responsiveness of a heat detecting unit such as a ceramic element is improved.

A heat detector 1 includes a ceramic element 10 accommodated in a sensing-device main body, and measures a temperature in a monitoring area based on a dielectric constant of the ceramic element 10. The Curie point temperature of the ceramic element 10 is set in a predetermined sensitive temperature range.

3 Claims, 15 Drawing Sheets

U.S. PATENT DOCUMENTS

2008/0246366 A1 * 10/2008 Burgener et al. ............ 310/300

FOREIGN PATENT DOCUMENTS

| | | |
|---|---|---|
| JP | 59-136818 | 8/1984 |
| JP | 61-45465 | 3/1986 |
| JP | 4-335329 | 11/1992 |
| JP | 5-266377 | 10/1993 |
| JP | 5-296854 | 11/1993 |
| JP | 6-30891 | 4/1994 |
| JP | 8-152363 | 6/1996 |
| JP | 10-300570 | 11/1998 |

OTHER PUBLICATIONS

Office Action issued by Japanese Patent Office dated Nov. 12, 2010.

* cited by examiner

[Fig. 1]
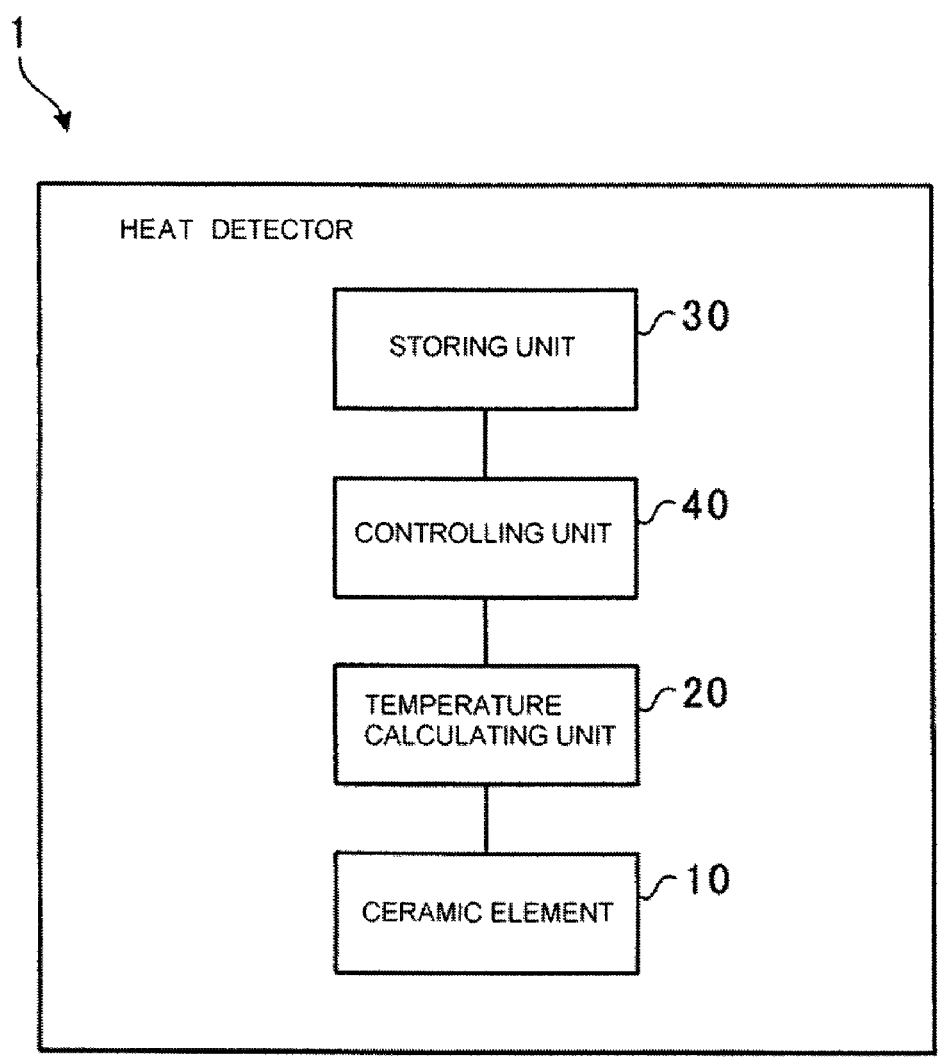

[Fig. 2]
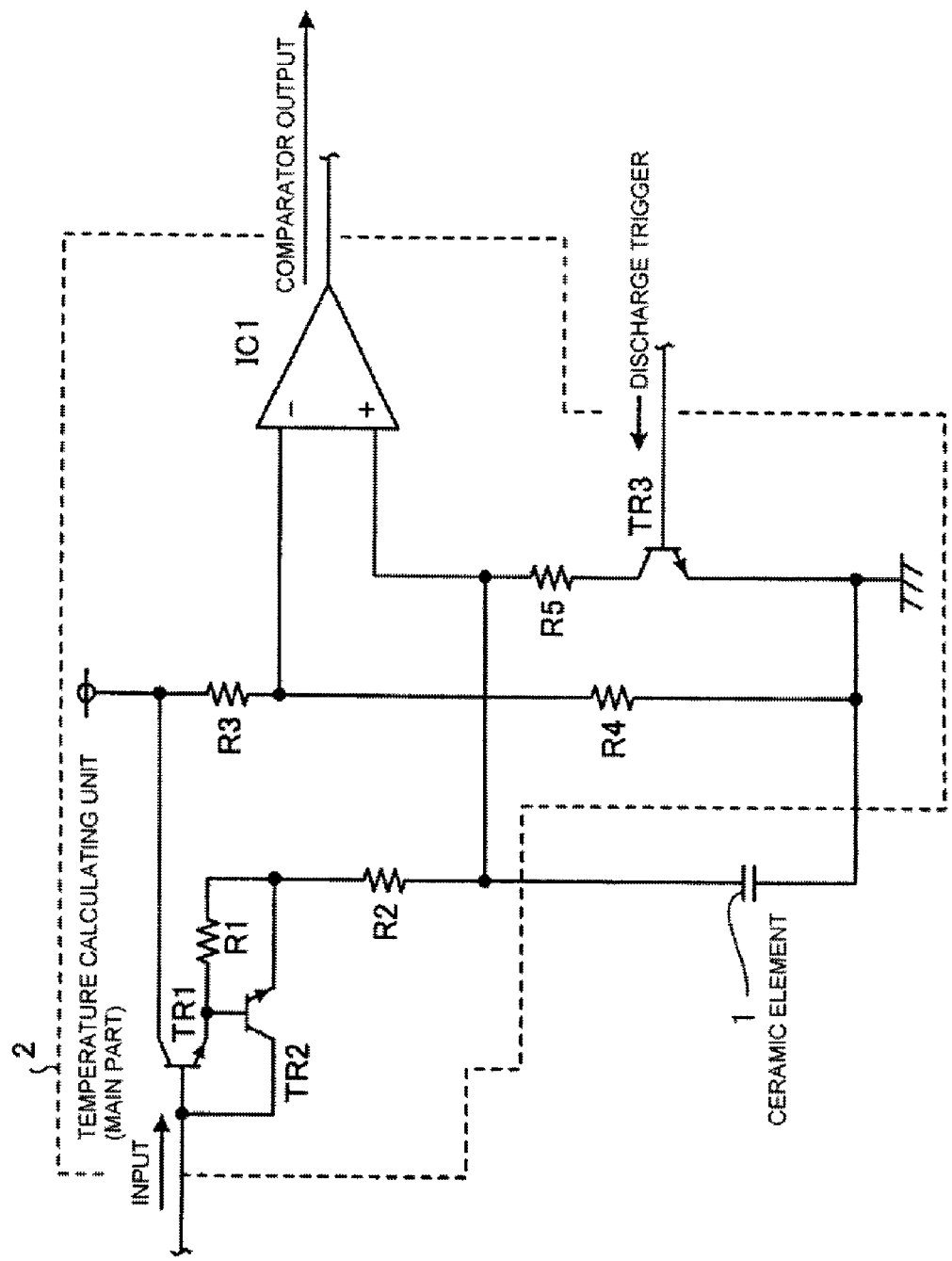

[Fig. 3]
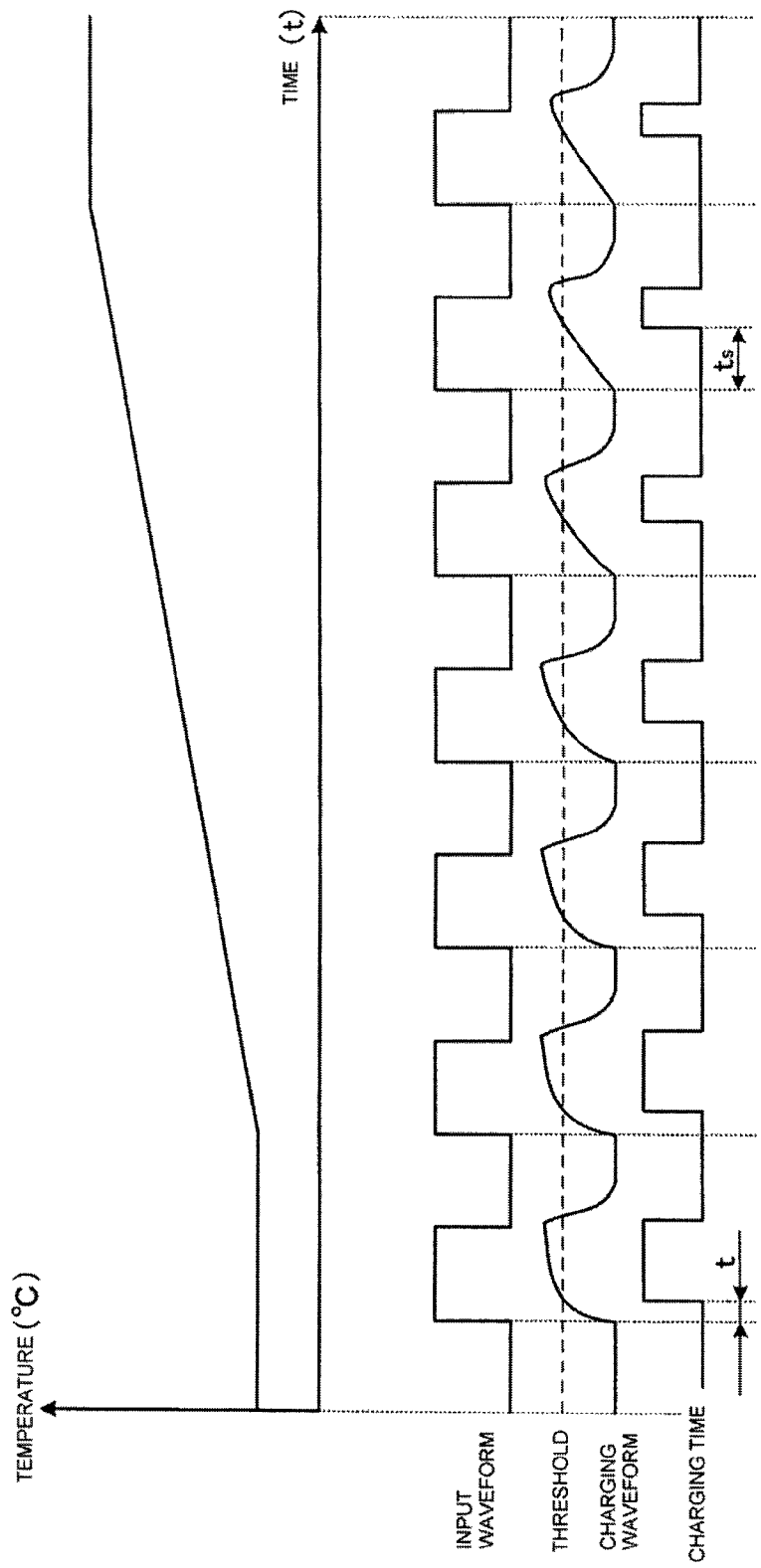

[Fig. 4]
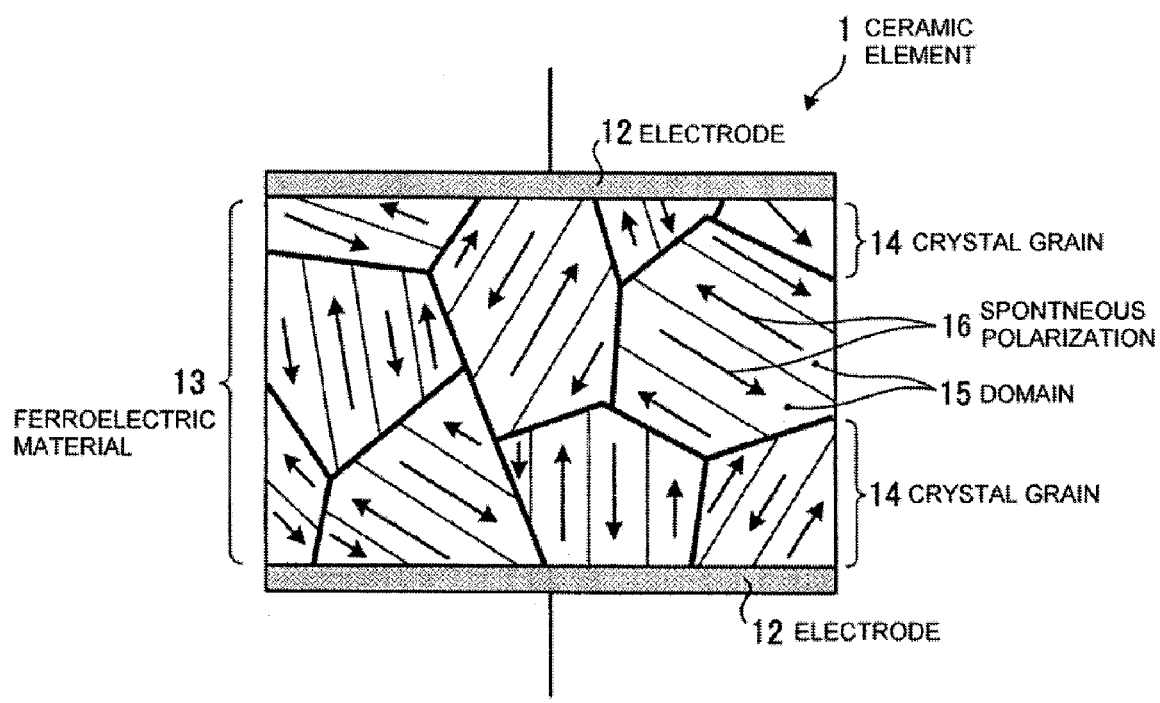

[Fig. 5]
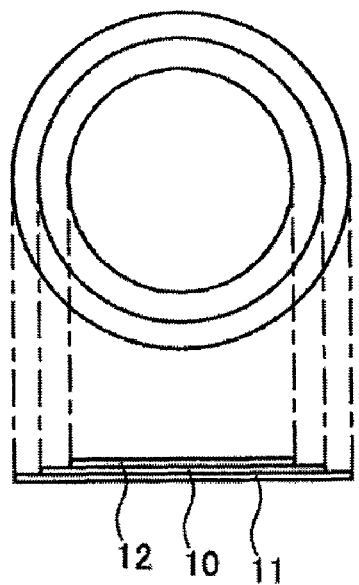
[Fig. 6]
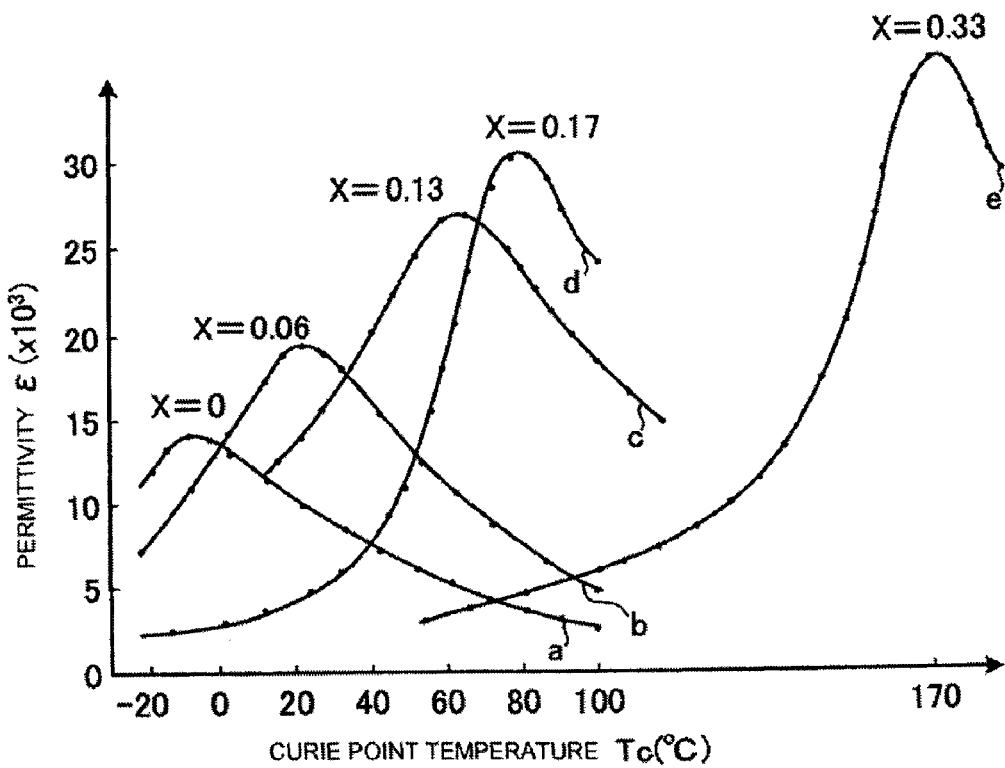

[Fig. 7]
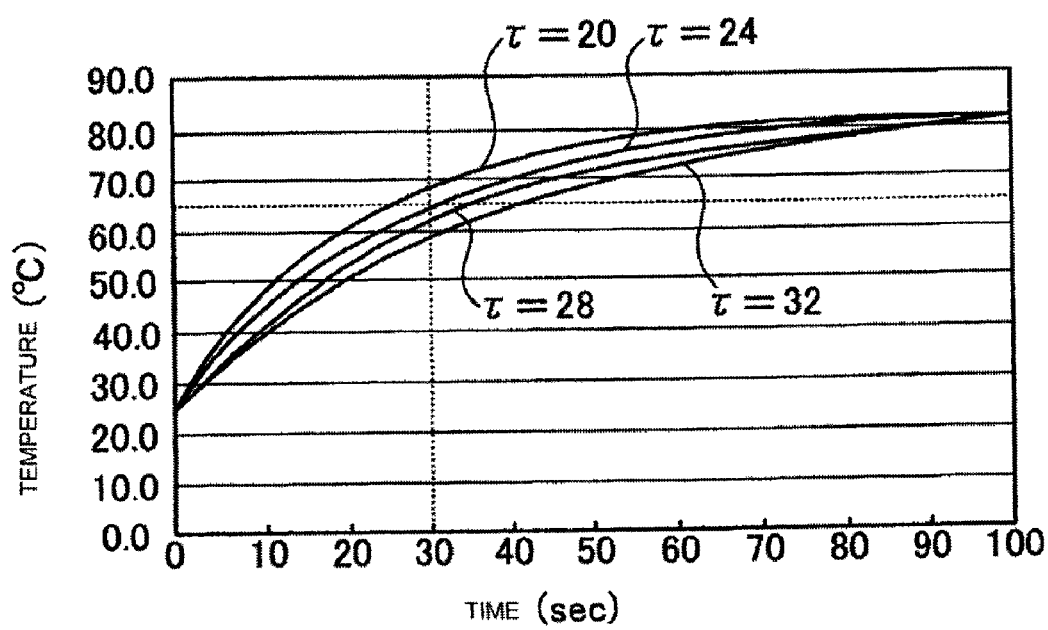
[Fig. 8]
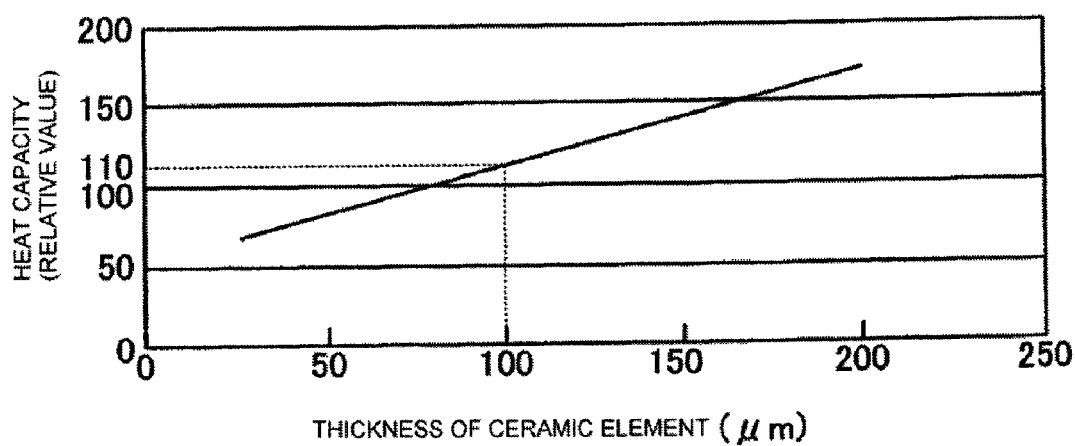

[Fig. 9]
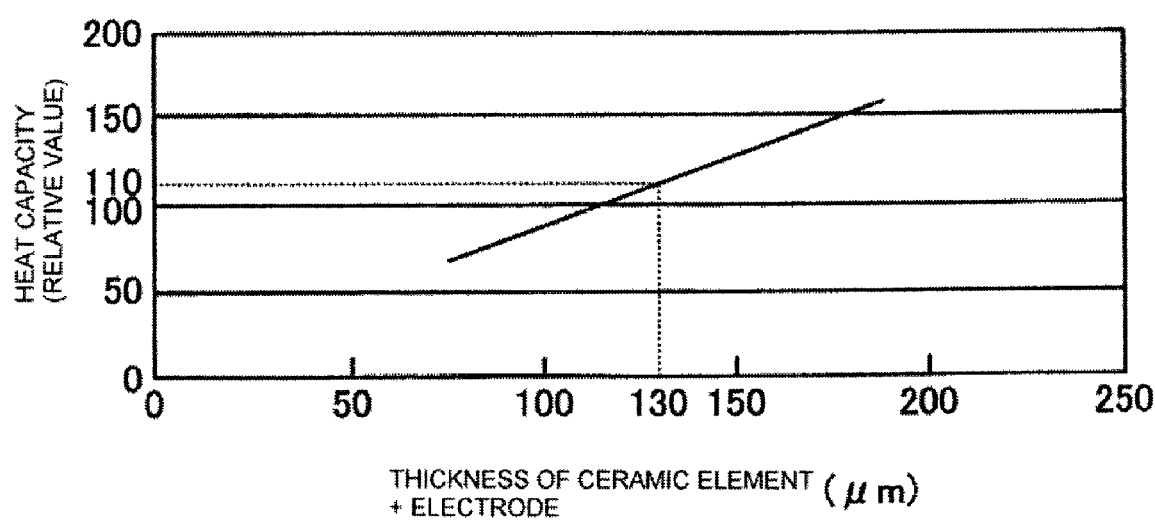

[Fig. 10]
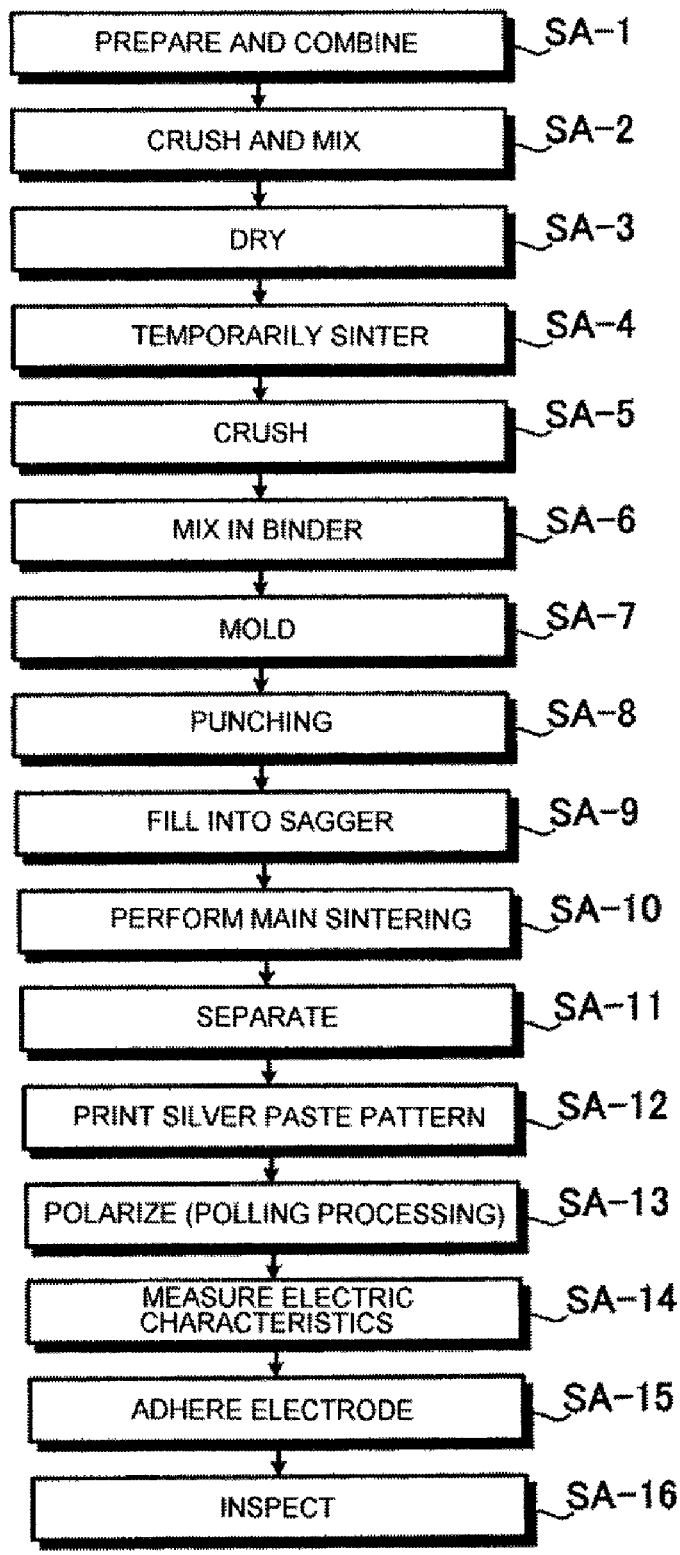

[Fig. 11]
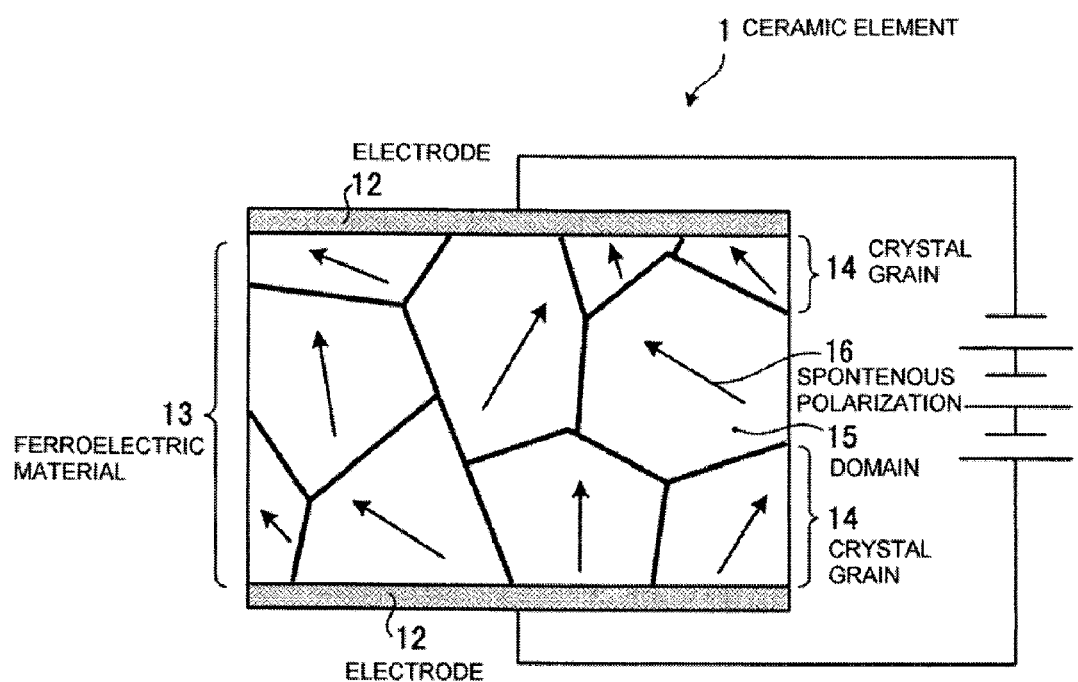

[Fig. 12]
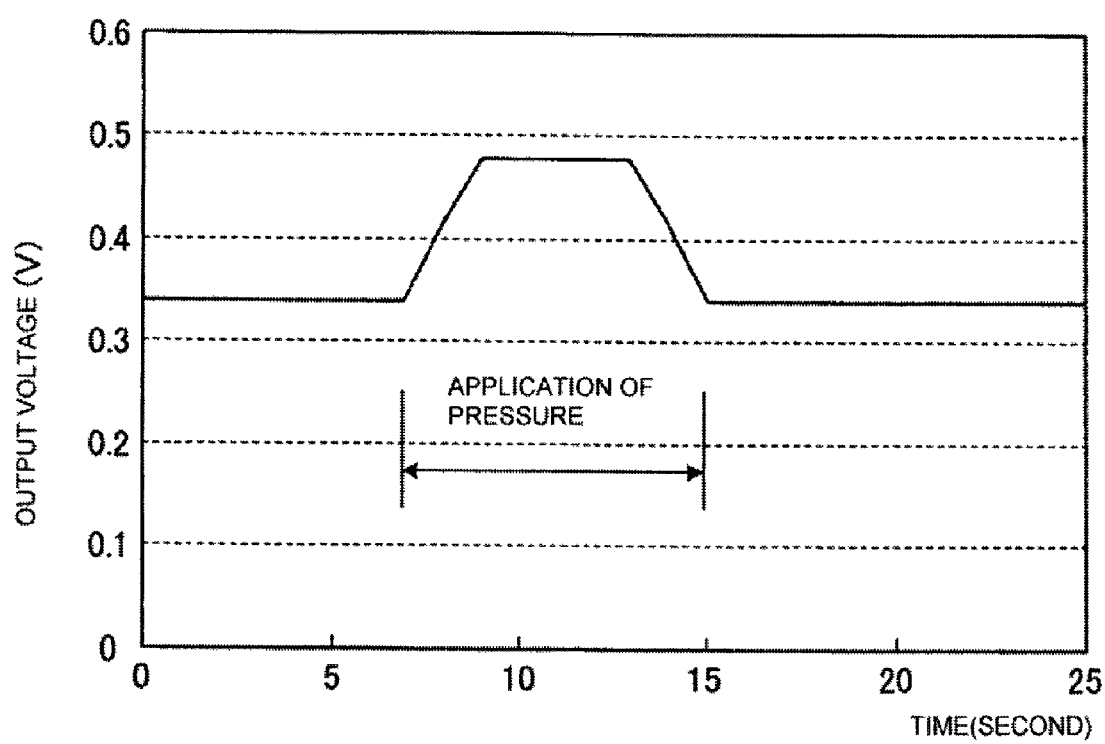

[Fig. 13]
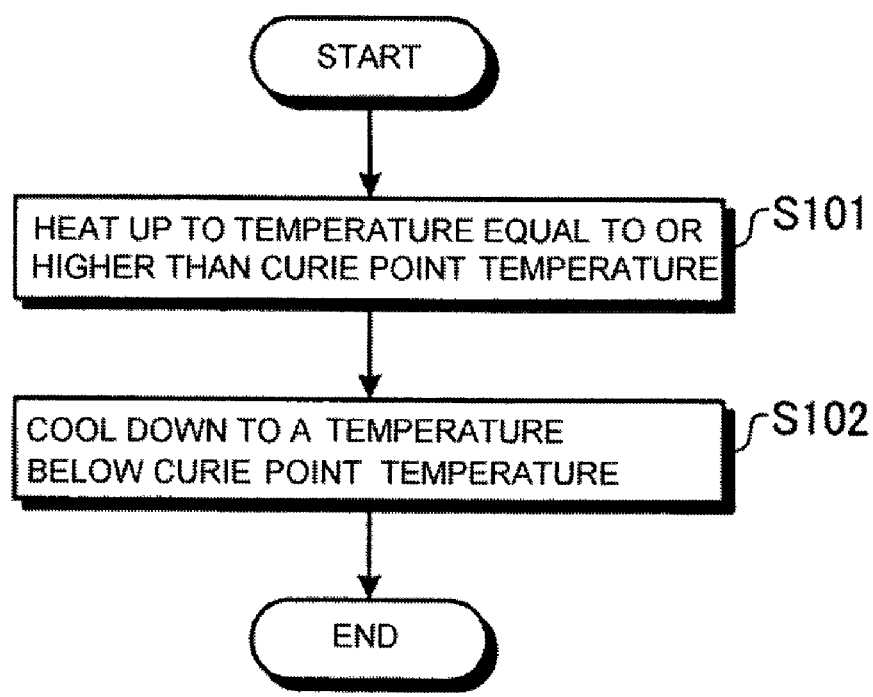

[Fig. 14]
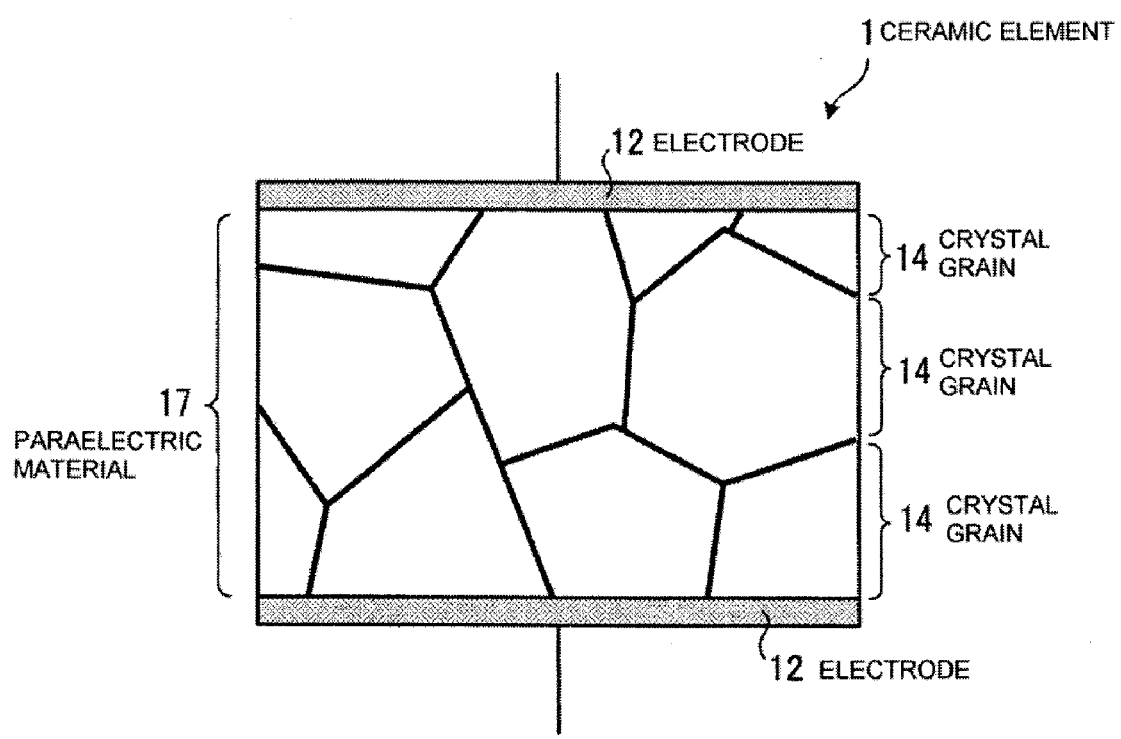

[Fig. 15]
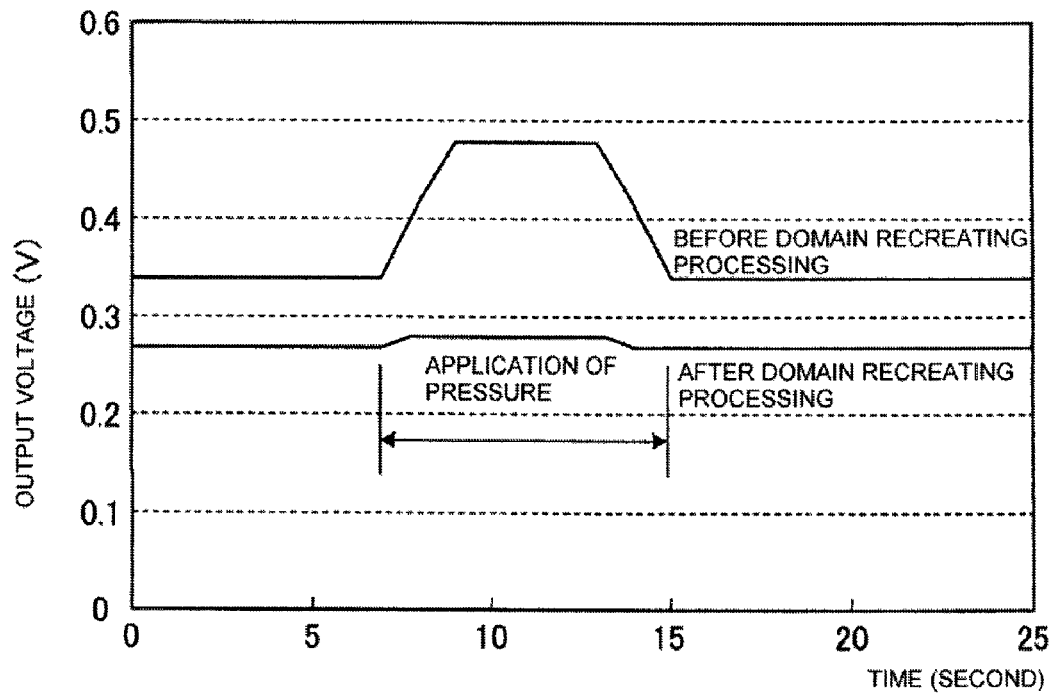
[Fig. 16]
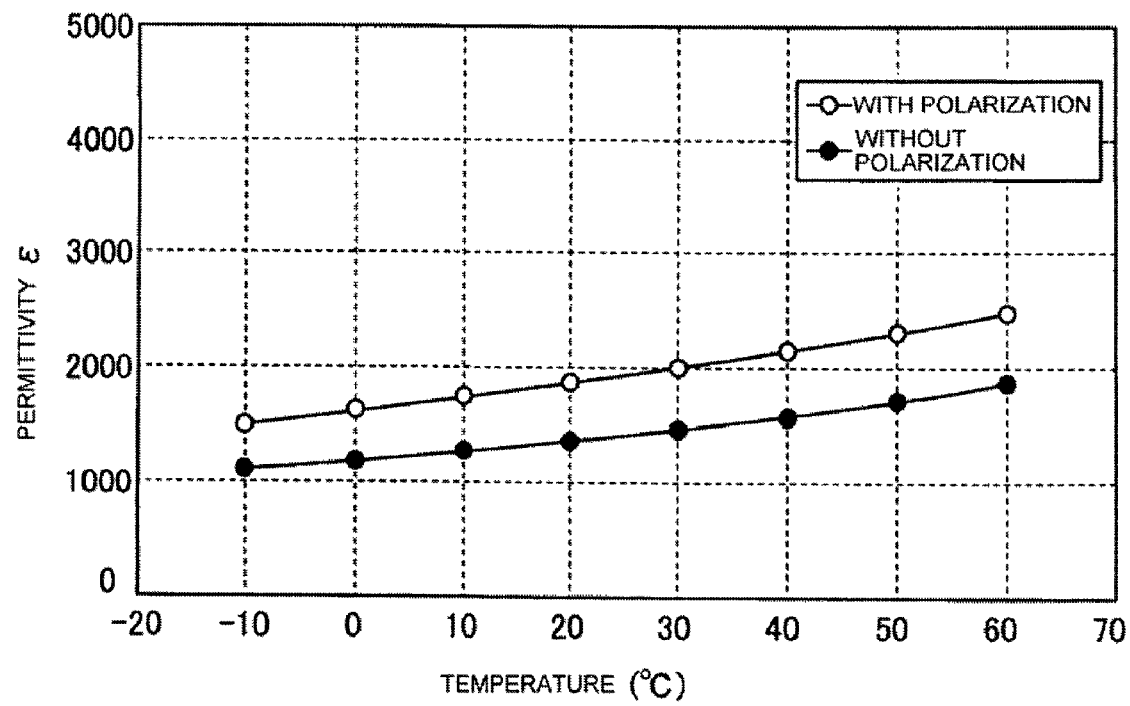

[Fig. 17]
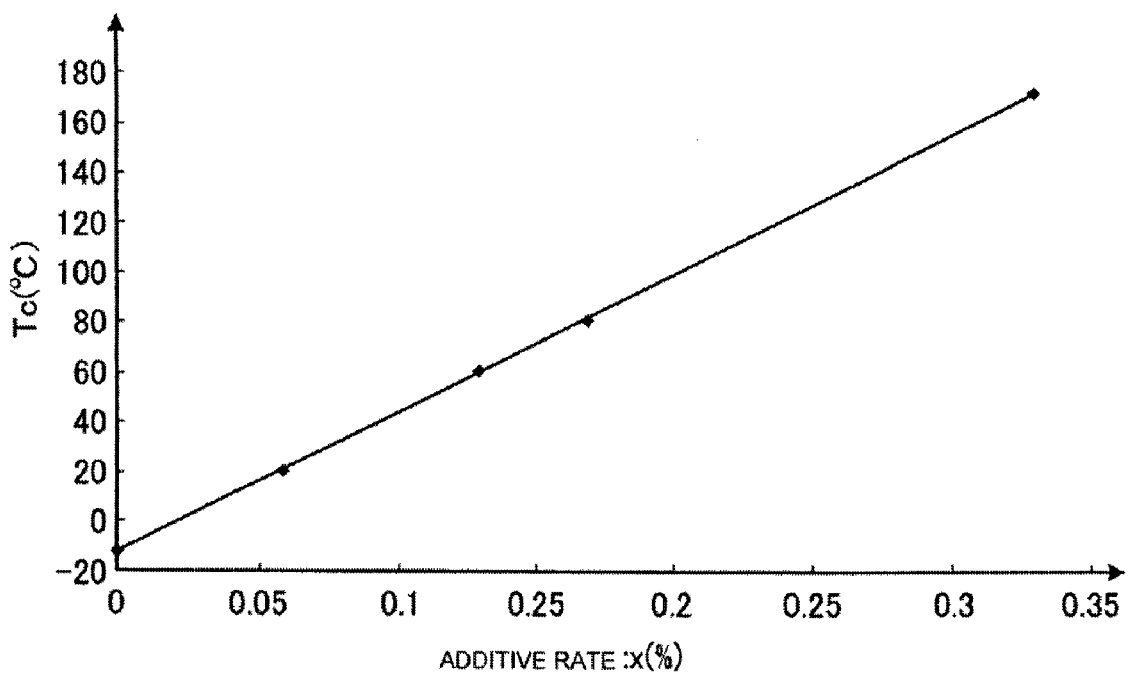
[Fig. 18]
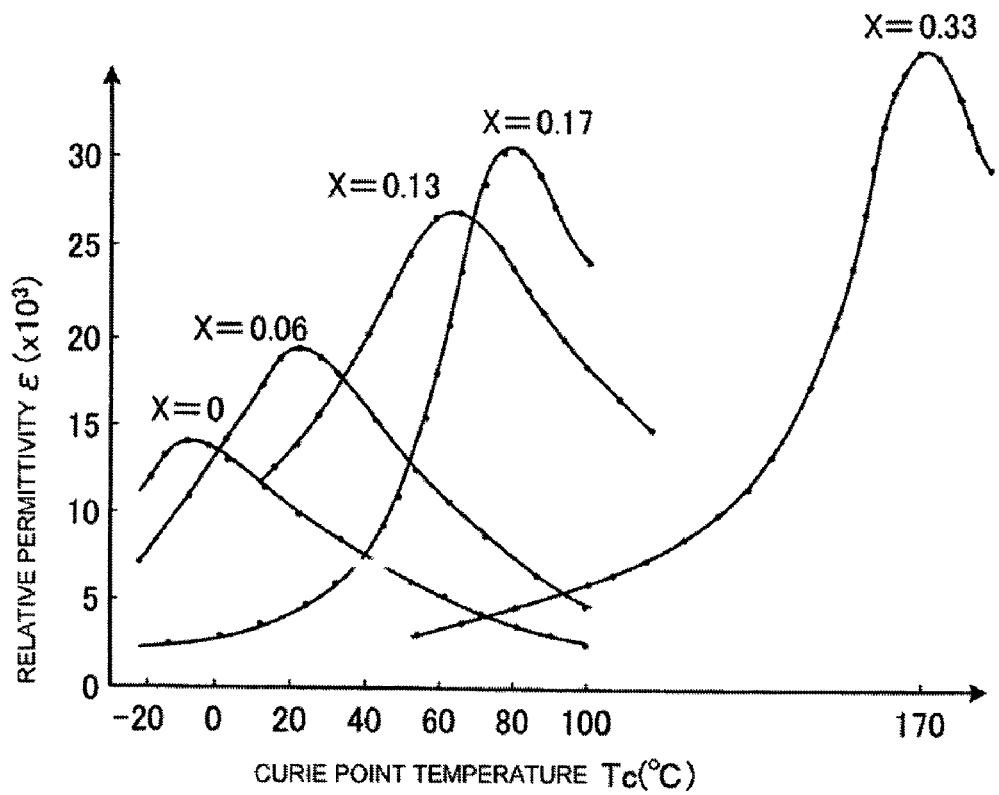

[Fig. 19]
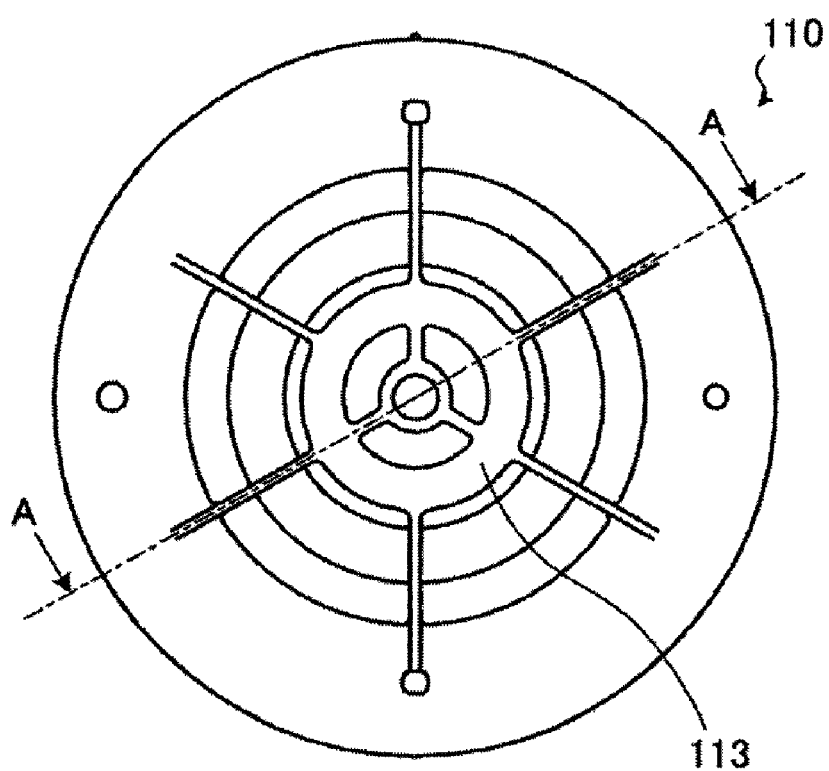
[Fig.20]
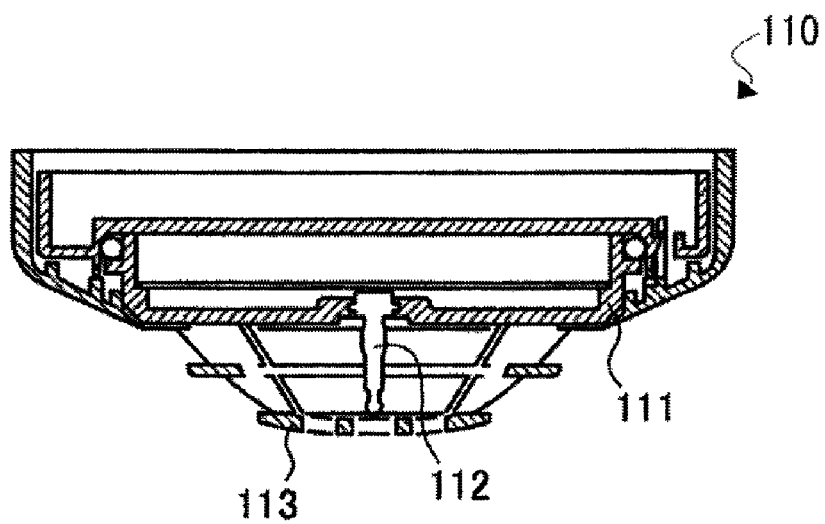

HEAT DETECTOR AND METHOD OF MANUFACTURING HEAT DETECTING ELEMENT

TECHNICAL FIELD

The present invention relates to a heat detector which senses heat in a monitoring area and raises an alarm and the like, and a method of manufacturing a heat detecting element used in the heat detector.

BACKGROUND ART

Conventionally, a heat detector (thermal sensing device) which senses an occurrence of a fire by sensing heat generated by the fire is proposed. Such heat detector generally includes a heat detecting unit that senses heat in a monitoring area and a sensing-device main body that raises an alarm according to a state sensed by the heat detecting unit.

The heat detecting unit has a sensor unit which senses heat in a monitoring area and converts a sensed state into another state change. The sensor unit is formed of, for example, a diaphragm which changes shape according to an expansion of air caused by temperature rise, a thermistor which changes resistance according to the temperature, or a bimetal which changes shape in a predetermined direction according to the temperature (see, for example, Japanese Patent Application Laid-Open No. H05-266377).

In a heat detector utilizing a diaphragm, the diaphragm is deformed when an air in a chamber expands suddenly according to the temperature rise caused by a fire. The heat detector detects when a rate of temperature rise reaches a predetermined value or a higher value by detecting the presence/absence of the deformation of the diaphragm. Then, the heat detector determines that a fire occurs in a monitoring area and outputs an alarm signal.

In a heat detector utilizing a thermistor, electric resistance of the thermistor changes according to the temperature rise caused by a fire. The heat detector detects changes in the electric resistance. When the changes in the electric resistance indicates that a rate of temperature rise is equal to or higher than a predetermined rate, the heat detector determines that a fire occurs in a monitoring area and outputs an alarm signal. FIG. 19 is a front view of a conventional thermistor-type heat detector, and FIG. 20 is a sectional view along A-A of the heat detector of FIG. 19. A heat detector 110 schematically includes a sensing-device main body 111 and a thermistor 112 which is arranged so as to protrude from one side surface of the sensing-device main body 111. The thermistor 112 is arranged like a projection so that the thermistor 112 is placed as far from the sensing-device main body 111 as possible for the prevention of thermal conduction between the sensing-device main body 111 and the thermistor 112, and at the same time so that an air flow from outside the sensing-device main body 111 hits the thermistor 112 as directly as possible for an enhancement of thermal responsiveness of the thermistor 112. Additionally, a thermistor guide 113 is arranged around the thermistor 112 for a protection of the vertically-arranged thermistor 112 from outside.

A heat detector utilizing bimetal utilizes a characteristic of bimetal, which is deformed in a predetermined direction according to the temperature; when the temperature reaches a predetermined temperature or higher and the bimetal undergoes large deformation to close an electric contact, the heat detector determines that a fire occurs in a monitoring area and outputs an alarm signal (see, for example, Japanese Utility Model Application Laid-Open No. H6-30891).

DISCLOSURE OF INVENTION

Problems to be Solved by the Invention

Conventional heat detectors 110, however, have various problems. For example, the heat detector provided with a diaphragm needs to have a chamber with a substantial expansion space in order to correctly detect the rate of temperature rise equal to or higher than a predetermined rate. The heat detector 110 provided with a thermistor is relatively bulky because the thermistor 112 itself is bulky and also because a thermistor guide 113 is provided around the thermistor 112. Thus, such a heat detector 110 is difficult to make thinner. Further, the heat detector provided with bimetal needs to save a sufficient space for the transformation of bimetal. Thus, downsizing of these conventional heat detectors is difficult to realize.

To solve the problems as described above, the inventors of the present invention and others examine the use of a ceramic element as a heat detecting element. The ceramic element is a ferroelectric material and outputs pyroelectric current by a pyroelectric effect at the temperature change. In recent years, a piezoelectric effect of the ferroelectric ceramic element and the like is focused, and the ceramic element and the like is applied to buzzers, speaker, and the like, and piezoelectric buzzers, piezoelectric speakers, and the like are made. The piezoelectric effect of the ferroelectric material causes a size of an intrinsic polarization to change in response to an application of a force in a predetermined direction, generating positive and negative electric charges on a surface of a crystal. A ceramic element manufactured for such a use is molded in a plate-like shape or a thin-film-like shape. Therefore, if such a ceramic element can be applied for heat detecting, a heat detector can be made thinner. Actually, some propose to perform temperature measurements using a piezoelectric material (see, for example, Japanese Patent Application Laid-Open No. H5-296854). The utilization of such techniques and the use of a ceramic element may realize a configuration of a small-size heat detector.

However, when the ceramic element utilized in the piezoelectric speaker and the like is employed as a heat detecting element as it is, various problems may arise. Elements used for fire sensing are subjected to various restrictions and have peculiar characteristics, which are not found in electronic devices such as speakers and buzzers. Therefore, a direct application of a conventional heat detecting element to a fire sensing device can raise new, unexpected problems.

For example, the dielectric constant of the ceramic element can draw a variation curve at different slope depending on a surrounding ambient temperature. In the conventional piezoelectric speakers or the like provided with the ceramic element, surrounding ambient temperature is not a big concern, and the temperature characteristic of the variation curve of the dielectric constant is seldom considered. When the conventional ceramic element is employed as it is in a peculiar temperature environment, i.e., a fire environment, a desired temperature characteristic of the ceramic element may not be obtained. For example, the variation curve of the dielectric constant may become excessively gentle. Then, a desired thermal responsiveness may not be obtained.

Further, the thermal capacity of the heat detecting element has an influence on the thermal responsiveness of the heat detector. The thermal capacity, however, is not much considered in the application of ceramic element to the conventional piezoelectric speakers and the like. Therefore, if the conventional ceramic element is used in a heat detector without change, a desired thermal responsiveness may not be obtained.

Still further, the ceramic element is usually subjected to polling process for an enhancement of piezoelectric effect, so that the piezoelectric ceramic is suitably applied to the buzzer or the speaker. In the polling process, voltage of a predetermined level or a higher is applied to a ferroelectric material. When the ferroelectric material is subjected to the polling process, a domain with polarization in an opposite direction to the vector of electric field is distinguished, and a domain with polarization in the same direction is generated. As a result, plural domains present in the ferroelectric material are integrated and intrinsic polarization can be orientated in different directions. Thus, the polling process makes a characteristic which is dependent on the orientation of the intrinsic polarization more apparent than other characteristics of the ferroelectric ceramic element. For example, the piezoelectric effect becomes more noticeable. When the polling process makes the piezoelectric effect of the ferroelectric ceramic element more noticeable, if an expansion of a surrounding member or the like pushes the ferroelectric ceramic element, the dielectric constant of the ferroelectric ceramic element might change due to the piezoelectric effect. Therefore, in some cases, it is not desirable to directly apply the ferroelectric ceramic element with a high piezoelectric effect to the heat detector.

Still further, when the intrinsic polarization of the ferroelectric ceramic element is forcibly orientated through the polling process, a complex residual stress field is expected to be generated in the ceramic element. This may change the dielectric constant over time. Such a possibility is not preferable since the reliability of the heat detector can be degraded in a long-time use.

The present invention is made in view of the foregoing, and an object of the present invention is to eliminate various problems which can arise when the piezoelectric ceramic element is applied to a peculiar device, i.e., a fire sensing device.

Means for Solving the Problems

To solve the problems as described above and to achieve an object, according to one aspect of the present invention, in a heat detector that measures temperature in a monitoring area based on a dielectric constant of a ceramic element, a Curie point temperature of the ceramic element is set within a certain range which has a predetermined relation with a sensitive temperature range of the heat detector.

Further, according to another aspect of the present invention, a method of manufacturing a heat detecting element that measures temperature in a monitoring area based on a dielectric constant of a dielectric material, includes heating up the dielectric material to a temperature equal to or higher than a Curie point temperature of the dielectric material; and cooling down the dielectric material to a temperature lower than the Curie point temperature.

EFFECT OF THE INVENTION

According to the present invention, the Curie point temperature of the ceramic element can be set so as to have a predetermined relation with the sensitive temperature range of the heat detector, and more particularly, the Curie point temperature can be set so that a neighboring range of the Curie point temperature in a temperature characteristic curve of the ceramic element substantially conforms to the sensitive temperature range, whereby the temperature sensing can be performed within a range where the temperature characteristic curve has a distinct slope. Thus, the thermal responsiveness of the heat detector can be enhanced. Therefore, the piezoelectric ceramic element can possess a special temperature sensing characteristic required in the fire sensing device, and the problems in the actual application of the piezoelectric ceramic element to the fire sensing device can be eliminated.

Further, according to the present invention, in the heating, the ferroelectric ceramic element that is subjected to the polling process and has a high piezoelectric effect is gradually heated up to a temperature equal to or higher than the Curie point temperature of the ferroelectric material provided in the ceramic element, and the ferroelectric ceramic element makes phase transition to the paraelectric material which does not have intrinsic polarization and domain. Further, in the cooling down, the ceramic element is cooled down to a temperature lower than the Curie point temperature, and makes phase transition to the ferroelectric material provided with plural domains each with intrinsic polarization in different direction. Thus, even when a force is applied to the ceramic element due to the expansion of the surrounding member or the like, the piezoelectric effects generated in the ferroelectric material provided with the plural domains with intrinsic polarization in different direction offset with each other, whereby the noises caused by the piezoelectric effect can be suppressed. On the other hand, since the slope of the temperature characteristic curve of the dielectric constant is little affected, only the noises attributable to the piezoelectric effect can be reduced and a suitable characteristic as the temperature detecting element can be obtained. Still further, since the domains are recreated at random so as to stabilize the energy state of the ferroelectric material, the complicated field of residual stress is not present in the ceramic element, whereby the change of the dielectric constant over time can be prevented. Therefore, the piezoelectric ceramic element can possess a special piezoelectric effect characteristic required in the fire sensing device, and the problems in the actual application of the piezoelectric ceramic element to the fire sensing device can be eliminated.

BEST MODES FOR CARRYING OUT THE INVENTION

A first and a second embodiments of the present invention will be described in detail below sequentially with reference to the accompanying drawings. It should be noted, however, that the present invention is not limited by the first and the second embodiments.

First Embodiment

The first embodiment will be described. The first embodiment relates to a heat detector for monitoring the temperature in a monitoring area. The heat detector can be used for monitoring any area for any purpose. In the following description of the first embodiment, the heat detector is supposed to be installed in a room of an ordinary house or an office complex to monitor whether the fire occurs or not. It should be noted that the first embodiment is similarly applicable to a heat detector such as a temperature sensor that measures the temperature in a monitoring area.

One object of the first embodiment is to provide a heat detector with an improved thermal responsiveness by optimizing various characteristics of a ceramic element employed as a heat detecting element. The improvement in the thermal responsiveness is achieved through: (1) optimization of the variation curve of the dielectric constant of the ceramic element, and (2) optimization of heat capacity of the ceramic element, for example. Such means are taken because the inventors of the present application found out that, for ensuring a desired thermal responsiveness of the heat detector, the variation curve of the dielectric constant of the ceramic element needs to be determined in consideration of the sensitive temperature range of the heat detector, and that the heat capacity of the ceramic element needs to be set in an appropriate range, for example. A heat detector which is structured in consideration of the points mentioned above will be described hereinbelow.

FIG. 1 is a functional block diagram of a structure of a heat detector. A heat detector 1 includes a ceramic element 10, a temperature calculating unit 20, a storing unit 30, and a controlling unit 40. The heat detector 1 with such structure performs fire detection as described below. First, the temperature of the ceramic element 10, which changes the temperature according to the temperature in the monitoring area, is calculated by the temperature calculating unit 20 based on the dielectric constant of the ceramic element 10. The controlling unit 40 compares the temperature of the ceramic element 10 and a threshold value stored in advance in the storing unit 30. When the temperature of the ceramic element 10 exceeds the threshold value, the controlling unit 40 determines that the fire occurs in the monitoring area, and instructs to output an alarm. In the following, a structure and a process of the heat detector 1 particularly related with the temperature calculation will be described.

First, a specific structure of a main part of the temperature calculating unit 20 will be described. The temperature calculating unit 20 is temperature calculating means for calculating the temperature in the monitoring area based on the dielectric constant of the ceramic element 10. FIG. 2 is a circuit diagram of the main part of the temperature calculating unit 20. As shown in FIG. 2, the main part of the temperature calculating unit 20 is formed from an electric circuit including plural transistors TR1 to TR3, resistors R1 to R5, and a comparator IC1 connected with each other as shown in the drawing.

Next, the temperature calculation by the temperature calculating unit 20 will be described. When the base terminal of the transistor TR3 receives a discharge trigger, the ceramic element 10 discharges electricity. When an input is supplied to an input unit not shown after the discharge, a constant current is supplied to the ceramic element 10 and the ceramic element 10 is charged. When an amount of electric charges of the ceramic element 10 exceeds a predetermined level during the process of charging, an output from the comparator IC1 is turned to "High." Hence, the time required for the charging of the ceramic element 10 up to approximately a level exceeding the predetermined level can be known from the measurement of time elapsed since the reception of input at the input unit after the discharge of the ceramic element 10 up to the time point when the output of the comparator IC1 attains "High." The charging time of the ceramic element 10 corresponds to the dielectric constant of the ceramic element 10 substantially uniquely. Further, the dielectric constant of the ceramic element 10 corresponds to the temperature of the ceramic element 10 substantially uniquely. Hence, the temperature of the ceramic element 10, i.e., the temperature of the monitoring area can be measured based on the charging time of the ceramic element 10.

FIG. 3 shows a relation between the temperature change of the ceramic element 10 and the charging time. As shown in FIG. 3, when the input unit receives a rectangular wave as an input, if the temperature of the ceramic element 10 rises, the rising of a charging waveform becomes gradually slower during an initial period of charging. Then, a time t (charging time) elapsed until the charging waveform exceeds the threshold becomes longer as shown by time ts. Hence, the temperature can be determined based on the charging time. Here, the storing unit 30 of FIG. 1 stores a table identifying a relation between the charging time and the temperature. The temperature calculating unit 20 can determine the temperature corresponding to the charging time by referring to the table. Specific numerical values of the relation between the charging time and the temperature can be easily obtained from an experiment or the like, and therefore the description thereof will not be given.

FIG. 4 is a schematic diagram of the ceramic element 10 as the heat detecting element. The ceramic element 10 described above is a ferroelectric material 13 (corresponding to "dielectric material" in the appended claims), which is a ferroelectric ceramic, at least in a temperature measurement range of the heat detector 1. The ferroelectric material 13 is formed from a PZT-type ferroelectric material (corresponding to "piezoelectric ceramic having a perovskite-like structure" in the appended claims), and in this case, forms a polycrystal consisting of plural fine single crystals 14 (crystal grains) combined at random. The crystal grain 14 is a fine crystal each polarized in a state where no electric voltage is applied (so as to have an intrinsic polarization 16), and divided into plural fine regions (domains 15) having different directions of intrinsic polarizations 16. The form of the domain 15 and the direction of the intrinsic polarization 16 are set so that the energy state of each crystal grain 14 or the ferroelectric material 13 is stabilized. Here, the polling process may be applied on to the ferroelectric material 13 so that the intrinsic polarization 16 which is arranged in different direction for each of the crystal grains 14 and the domains 15 are oriented. Then, the piezoelectric effect that is dependent on the direction of the intrinsic polarization 16 becomes even more distinct.

A specific example of the structure of the ceramic element 10 will be further described. FIG. 5 is a view where a plan view and a vertical section of the ceramic element 10 and other elements are shown in relation with each other. As shown in FIG. 5, the ceramic element 10 is formed substantially as a circular plate with electrodes 11 and 12 formed as a pair provided on respective surfaces thereof. The electrodes 11 and 12 are electrode for supplying the pyroelectric current supplied from the ceramic element 10 to the temperature calculating unit 20 via an electric wire not shown. The electrodes 11 and 12 are each formed by a metallic plate adhered to the ceramic element 10, or alternatively by metal attached on the ceramic element 10 by vapor deposition, for example.

On Curie Point Temperature Tc of Ceramic Element 10

Next, a structure for optimizing the temperature characteristics of the dielectric constant of the ceramic element 10 will be described. For the optimization of the temperature characteristics, the Curie point temperature Tc of the ceramic element 10 is preferably set in a predetermined temperature range, e.g., in a range from approximately 60 degrees Centigrade to approximately 170 degrees Centigrade. The reason is as follows.

First, the Curie point temperature Tc is preferably higher than the general sensitive temperature range of the heat detector 1. The reason is, when the Curie point temperature Tc is within or lower than the sensitive temperature range, if the temperature to be sensed is higher than the Curie point temperature Tc of the dielectric, the ceramic element 10 transits from the ferroelectric material to a paraelectric material thereby changing its characteristics. Since the general sensitive temperature range of the heat detector 1 is a range from 20 degrees Centigrade to 60 degrees Centigrade, the Curie point temperature Tc is preferably equal to or higher than approximately 60 degrees Centigrade.

Further, to obtain a high signal to noise (S/N) ratio in the temperature measurement by the heat detector 1, the heat detecting is preferably performed within a range where the slope of the temperature characteristic of the dielectric constant of the ceramic element 10 is distinct. In other words, the range where the slope of the temperature characteristic of the dielectric constant of the ceramic element 10 is distinct is preferably made to conform to the sensitive temperature range of the heat detector 1. Here, the slope of the temperature characteristic of the dielectric constant of the ceramic element 10 tends to become sharpest in the neighborhood of the Curie point temperature Tc of the ceramic element 10, whereas the slope tend to become gentler as the difference between the pertinent temperature and the Curie point temperature Tc becomes larger. Hence, a portion in the neighborhood of the Curie point temperature Tc, which has a sharp slope in the characteristic curve of the ceramic element 10 (i.e., a range where the temperature is lower than the Curie point temperature Tc by approximately 30 to 50 degrees Centigrade, for example, a range where the temperature is the Curie point temperature Tc minus 40 degrees Centigrade) is preferably made to conform to the sensitive temperature range of the heat detector 1.

To set the Curie point temperature Tc and the sensitive temperature range in a predetermined relation, additive rate x of impurity may be changed. For example, FIG. 6 shows a relation between the Curie point temperature Tc and relative permittivity $\in$. Assume that lead titanate ($PbTiO_3$), which is one of perovskite-like crystals, is employed and $Pb(Mg_{1/3}Nb_{2/3})O_3$ is doped. If the additive rate of the impurity is represented by "x," the structure of the lead titanate can be represented as "$(1-x) \times Pb(Mg_{1/3}Nb_{2/3})O_3-x \times PbTiO_3$." FIG. 6 shows temperature characteristic curves a to e each representing a case with different additive rate x of impurity. As can be seen from FIG. 6, along with the change in the additive rate x, the Curie point temperature Tc becomes approximately −10, 20, 60, 80, 170 degrees Centigrade, respectively, and is represented as the temperature characteristic curves a to e. As also shown in FIG. 6, in each of the temperature characteristic curves a to d with different additive rates x of the impurity, the slope becomes sharper in the neighborhood of the Curie point temperature Tc. For example, in the characteristic curve d with the additive rate x=0.17, the slope representing the temperatures in the range from 50 to 80 degrees Centigrade is sharper than the slope representing the same range in the characteristic curve e with the additive rate x=0.33.

Next, a relation between each of the characteristic curves and S/N will be examined. Assume that the Curie point temperature Tc is approximately 60, 80, and 170 degrees Centigrade, and the sensitive temperature is 20 degrees Centigrade and 60 degrees Centigrade. The rate of change in the dielectric constant between the case of 20 degrees Centigrade and the case of 60 degrees Centigrade (i.e., dielectric constant in the case of 60 degrees Centigrade/dielectric constant in the case of 20 degrees Centigrade) is calculated for each Curie point temperature Tc. When the Curie point temperature Tc is approximately 60 degrees Centigrade, the rate of change in dielectric constant is 27.5E−3/14E−3=2.0; when the Curie point temperature Tc is approximately 80 degrees Centigrade, the rate of change in dielectric constant is 22E−3/5E−3=4.4, and when the Curie point temperature Tc is approximately 170 degrees Centigrade, the rate of change in dielectric constant is 3.9E−3/1.9E−3=2.1. Therefore, when the Curie point temperature Tc is approximately 60 to 170 degrees Centigrade, S/N ratio is equal to or higher than 2.0 for the temperature change within the sensitive temperature range of 20 to 60 degrees Centigrade, whereas when the Curie point temperature Tc is not within the range of approximately 60 to 170 degrees Centigrade, S/N ratio is equal to or lower than 2.0.

Next, S/N ratio required in the heat detector 1 will be examined. In general, higher S/N ratio of a sensor is more preferable in the heat detector 1. To maintain a stable sensing characteristic, S/N ratio is required to be at least equal to or higher than 2. The reason is as follows. According to legal regulations prescribing the performance of the heat detector 1 (for example, "Ministerial Order Stipulating Technical Standard Relating Sensors and Transmitters of Fire Alarm Installation" of Japan), the special 65-degrees fixed-temperature-type heat detector should not operate within one minute after the same is thrown into an ambient temperature of 55 degrees Centigrade (non-operation test). Assume that the Curie point temperature Tc is approximately 60, 80, and 170 degrees Centigrade, and the rate of change in the dielectric constant is calculated for the sensitive temperature of 20 degrees Centigrade and the sensitive temperature of 55 degrees Centigrade (i.e., dielectric constant of 55 degrees Centigrade/dielectric constant of 20 degrees Centigrade). When the Curie point temperature Tc is approximately 60 degrees Centigrade, the rate of change in dielectric constant is 26.8E−3/14E−3=1.9; when the Curie point temperature Tc is approximately 80 degrees Centigrade, the rate of change in dielectric constant is 17E−3/5E−3=3.4; and when the Curie point temperature Tc is approximately 170 degrees Centigrade, the rate of change in dielectric constant is 3.6E−3/1.9E−3=1.9. In brief, the minimum S/N ratio here is approximately 1.9.

Hence, to make the heat detector 1 pass the non-operation test, the S/N ratio of 1.9 which is obtained under the environment of 55 degrees Centigrade of the non-operation test and the S/N ratio of 2.0 or more which is higher than the S/N ratio of 1.9 needs to be distinguished from each other by the controlling unit 40 of the heat detector 1. In practice, such distinction needs to be correctly made under the environment where electric noises and pseudo signals caused by factors of mechanical variations are present. When the size of such noises is assumed to be 5% of the signal, S/N ratio is required to be 2.0 or more at minimum. To make the S/N ratio 2.0 or more, it may be sufficient if the Curie point temperature Tc is set within the range of approximately 60 to 170 degrees Centigrade as mentioned above. Thus, it can be understood that the Curie point temperature Tc of the ceramic element 10 employed in the heat detector 1 is preferably within the range of approximately 60 to 170 degrees Centigrade.

On Thickness of Ceramic Element 10

Next, an appropriate thickness of the ceramic element 10 will be examined. In general, the heat capacity of the ceramic element 10 tends to increase along with the increase in the plate thickness of the ceramic element 10. When the heat capacity of the ceramic element 10 increases, however, the time required for the temperature of the ceramic element 10 to rise after a flow of hot air from the monitoring area hits the ceramic element 10 becomes longer, whereby the thermal responsiveness is deteriorated. Hence, the thinner ceramic element 10 is preferable, as far as the ceramic element 10 satisfies a necessary requirement of resistance or the like.

Next, the heat capacity of the ceramic element 10 will be examined. Temperature T(t) obtained t seconds after the ambient temperature reaches Tf can be expressed by a following formula (1). Further, if the heat capacity is represented as C=γcV, the time constant can be expressed by a following formula (2):

$$T(t)-Tf=(T0-Tf) \times \text{Exp}(-t/\tau) \quad (1),$$

$$\tau = C/hA \quad (2),$$

where T0 is initial temperature, τ is time constant and represented as γcV/hA, γ is weight volume ratio, c is specific heat, V is volume, h is heat conductivity, and A is surface area.

FIG. 7 shows difference in characteristic of heat sensitivity according to thermal time constant calculated by the formula (1) in an operation test of the special 65-degrees sensing device. According to the above-mentioned Ministerial Order prescribing the performance of the heat detector 1, the special 65-degree fixed-temperature-type heat detector needs to start operating within 30 seconds when thrown into the ambient temperature of 81 degrees Centigrade. In this case, the time constant τ of the heat detector 1 is required to be equal to or lower than 24 seconds according to FIG. 7.

In order to set the time constant equal to or lower than 24 seconds, the heat capacity is required to be equal to or lower than a predetermined amount, since the time constant τ is proportional to the heat capacity as shown in the formula (2). The heat capacity is proportional to the volume of the ceramic element 10 and of the electrodes 11 and 12 that are in contact with the ceramic element 10. A diameter of the ceramic element 10 or a diameter of the electrode 11 or 12 needs to be sufficiently large so that the ceramic element 10 and the electrodes 11 and 12 can surely receive the flow of hot air from the monitoring area. Specifically, the thicknesses of the ceramic element 10 and the electrodes 11 and 12 need to be adjusted.

A trial product is fabricated with the thickness of the ceramic element 10 of 80 μm, and the thickness of the electrodes 11 and 12 of 50 μm. When the heat sensitivity of the trial product is measured, the time constant of the ceramic element 10 and the electrodes 11 and 12 is approximately 21 seconds. Since the time constant τ of the heat detector 1 is 24 seconds as described above, the heat detector 1 needs to include the ceramic element 10 and the electrodes 11 and 12 with the heat capacity of approximately 110% (≅24/21) or less with respect to that of the trial product, in order to satisfy the standard as the heat detector.

FIG. 8 shows a relation between the thickness of the ceramic element 10 (horizontal axis) and the heat capacity as a relative value (vertical axis), and FIG. 9 shows a relation between the combined thickness of the ceramic element 10 and the electrodes 11 and 12 (horizontal axis) and the heat capacity as a relative value with respect to the trial product mentioned above (vertical axis). As can be seen from FIGS. 8 and 9, the ceramic element 10 needs to have a thickness of approximately 100 μm or less, and the combined thickness of the ceramic element 10 and the electrodes 11 and 12 needs to be approximately 130 μm or less, if the heat capacity of approximately 110% or less is required. With the reduction of heat capacity, when the ceramic element 10 receives the flow of hot air generated by the fire, the temperature of the ceramic element 10 immediately rises and a swift heat sensing can be performed.

Next, a method of manufacturing the ceramic element 10 according to the first embodiment will be described. FIG. 10 is a flowchart of the method of manufacturing. As shown in FIG. 10, firstly, materials forming the ceramic element 10 are prepared and combined. Specifically, a desired additive rate of impurity is added to metal oxides (PbO, $TiO_2$, $ZrO_2$, or the like) (step SA-1). Then these materials are crushed and mixed (step SA-2), dried in a dryer (step SA-3), temporarily sintered in a crucible at the temperature of 800 to 850 degrees Centigrade, and turned into a sintered material ($PbO_3$, $TiO_3$, $ZrO_3$, or the like) (step S-4).

Then, the obtained sintered material is crushed (step SA-5). The resulting powders are mixed in a binder (step SA-6), and molded into a substantially plate-like shape (step SA-7). Then the plate-like molding is punched so that a disk-like product is obtained (step SA-8). The disk-like products are divided into a unit of a few disks and each unit is put into a sagger (step SA-9). The sagger is put into a tunnel furnace or the like and subjected to main sintering for approximately two days at the temperature of approximately 1100 to 1200 degrees Centigrade (step SA-10). Then the disks are separated from the sagger while the ultrasonic or the like is being applied thereto (step SA-11), and a silver paste is printed onto one side surface of the disk in a pattern, which later forms the electrode 11 (step SA-12). After polarization processing (polling process) is performed as necessary to enhance the piezoelectric effect (step SA-13), the electric characteristics are measured (step SA-14), and the electrode 12 is adhered to a side surface, to which the silver paste is not applied, of the disk (step SA-15). With the inspection (step SA-16), the heat detector is finished.

According to the first embodiment, the Curie point temperature of the ceramic element can be set as to have a predetermined relation with the sensitive temperature range of the heat detector, more particularly, the neighborhood area of the Curie point temperature in the temperature characteristic curve of the ceramic element can be made to substantially conform to the sensitive temperature range. Whereby the temperature detection can be performed in a range where the slope of the temperature characteristic curve is distinct and the thermal responsiveness of the heat detector can be enhanced.

Further, according to the first embodiment, the thickness of the ceramic element can be set to a thickness equal to or lower than a thickness substantially corresponding to the predetermined time constant in the fire sensing, whereby the heat capacity of the ceramic element can be reduced. Thus, the thermal responsiveness of the heat detector can be enhanced.

Second Embodiment

The second embodiment will be described next.

In the first embodiment as described above, the ceramic element 10 is subjected to the polling process so that the intrinsic polarization is oriented in different direction for each fine crystal and each domain. When the polling process is performed, however, the ferroelectric ceramic element 10 as described above comes to exhibit notable piezoelectric effect that depends on the orientation of the intrinsic polarization. Hence, when the surrounding members push the ferroelectric ceramic element 10 due to expansion or the like, the electric charges of the ceramic element 10 changes more easily due to the piezoelectric effect than in the ceramic element 10 not subjected to the polling process.

In the second embodiment, a method of manufacturing the heat detector in which the noises caused by the piezoelectric effect are reduced will be described. The second embodiment is characterized mainly in; (1) that it is a method of manufacturing a heat detecting element that measures the temperature in the monitoring area based on the dielectric constant of the dielectric material, and that the method includes heating up of the dielectric material to a temperature equal to or higher than the Curie point temperature of the dielectric material, and cooling down the dielectric material to a temperature below the Curie point temperature of the dielectric material; and (2)

that, in the heating up of the dielectric material, the dielectric material is maintained at the temperature equal to or higher than the Curie point temperature for a predetermined time period, for example.

Outline of Ceramic Element 10

First, a ceramic element which is manufactured by the method of manufacturing the heat detecting element according to the second embodiment will be described. FIG. 11 is a schematic diagram of the ceramic element 10 that has a high ferroelectric characteristic after being subjected to the polling process by the manufacturer or the like and before the implementation of the method of manufacturing the heat detecting element according to the second embodiment. Due to the application of a high direct current electric voltage, the plural domains 15 of the respective crystal grains 14 of the ceramic element 10 are integrated with each other, and the intrinsic polarization 16 is oriented. Further, as the ferroelectric material 13, which is polycrystal, as a whole, the intrinsic polarization is generally oriented. FIG. 12 shows changes over time of the output voltage of the ceramic element 10 whose intrinsic polarization 16 is oriented by the polling process. FIG. 12 shows how the output voltage of the ceramic element 10 changes when a pressure is applied to the ceramic element 10 under the condition of fixed temperature. It can be seen from FIG. 12 that the output voltage of the ceramic element 10 significantly changes during the application of the pressure due to the piezoelectric effect. The method of manufacturing the heat detecting element according to the second embodiment is applied to the ceramic element 10 whose domains are integrated, and the intrinsic polarization 16 is oriented by the polling process. The method is performed to change the state of the ceramic element 10 whose domains are integrated and whose intrinsic polarization 16 is oriented back to the state prior to the polling process. The method of manufacturing the heat detecting element according to the second embodiment will be described below as a domain recreating process.

Outline of Domain Recreating Process

FIG. 13 is a flowchart of a process sequence of the domain recreating process. First, the ceramic element 10 is gradually heated up to a temperature equal to or higher than the Curie point temperature of the ferroelectric material 13 (step S101), and is maintained at the temperature equal to or higher than the Curie point temperature for a predetermined time period (corresponding to "heating up" in the appended claims). When the ferroelectric material 13 included in the ceramic element 10 is, for example, the PZT-type ferroelectric material 13, the Curie point temperature of the PZT-type ferroelectric material 13 is approximately 200 degrees Centigrade. Hence, the ferroelectric material 13 is gradually heated up to a temperature equal to or higher than 200 degrees Centigrade and maintained at the temperature equal to or higher than 200 degrees Centigrade for 30 minutes.

The ferroelectric material 13 loses the intrinsic polarization 16 and the domains 15 shown in FIG. 11 when heated up to a temperature equal to or higher than its inherent Curie point temperature, and causes phase transition to turn into a paraelectric material. FIG. 14 is a schematic diagram of the ceramic element 10 heated up to the temperature equal to or higher than the Curie point temperature. As shown in FIG. 14, a paraelectric material 17 (corresponding to "dielectric material" in the appended claims) loses the intrinsic polarization 16 and the domains 15.

Returning to FIG. 13, the ceramic element 10 described above is cooled down to a temperature below the Curie point temperature described above (step S102: corresponding to "cooling down" in the appended claims). When the ceramic element 10 is cooled down to the temperature below the Curie point temperature, the paraelectric material causes phase transition to turn into the ferroelectric material 13 again. At the phase transition, plural domains 15 having intrinsic polarization 16 in different directions are generated at random again, so as to form the ferroelectric material 13 as shown in FIG. 11. Thus, the domain recreating process ends.

Next, the ferroelectric material 13 with the oriented intrinsic polarization 16 before the domain recreating process and the ferroelectric material 13 having the plural domains with different directions of intrinsic polarization generated by the domain recreating process will be compared with respect to the output voltage. FIG. 15 shows changes over time of the output voltage of the ceramic element 10 before and after the domain recreating process. It can be seen from FIG. 15 that the changes in the output voltage during the application of pressure becomes extremely smaller after the domain recreating process compared with that before the domain recreating process.

Thus, according to the second embodiment, the ceramic element 10 including the ferroelectric material 13 subjected to the polling process is gradually heated up to the temperature equal to or higher than the Curie point temperature of the ferroelectric material 13 in the ceramic element 10 during the heating up, so that the ferroelectric material 13 causes phase transition to turn into the paraelectric material 17 without the intrinsic polarization 16 and the domains 15. Further in the cooling down as described above, the ceramic element 10 is cooled down to the temperature below the Curie point temperature, and the paraelectric material 17 causes phase transition to turn into the ferroelectric material 13 having the plural domains 15 with intrinsic polarizations 16 in different directions. Thus, even if a force is applied to the ceramic element 10 due to the expansion of the surrounding members or the like, the piezoelectric effects generated in the ferroelectric material 13 having the plural domains 15 with intrinsic polarizations 16 in different directions offset with each other, whereby the noises attributable to the piezoelectric effect can be reduced.

Further, since the ceramic element 10 is maintained at the temperature equal to or higher than the Curie point temperature for the predetermined time period in the heating up described above, distortion or the like generated at the polling process is removed. Hence, in the cooling down, such distortion does not affect the phase transition of the paraelectric material 17 to the ferroelectric material, and domains are formed at random.

The domain recreating process realizes random recreation of the domains 15 in such a manner that the energy state of each crystal grain 14 or the ferroelectric material 13 becomes stable. Hence, a complicated residual stress field is not present in the ceramic element 10 and the changes of the dielectric constant over time can be prevented.

Influence of Domain Recreating Process on Slope of Temperature Characteristic of Dielectric Constant In particular, since the temperature characteristic of the dielectric constant can be maintained substantially at the same level before and after the domain recreating process even when the distortion or the like generated at the polling process is removed in the domain recreating process, a preferable characteristic as a temperature detecting element can be obtained. FIG. 16 shows a relation between the temperature and the dielectric constant before and after the domain recreating process. In FIG. 16, a plot shown by white dots is data on the ceramic element 10 having polarization (i.e., after the polling process and before the domain recreating process), and a plot shown by black dots is data on the ceramic element 10 having no polarization (i.e., after the polling process and the domain recreating process).

As shown in FIG. 16, the dielectric constant of the ceramic element 10 with no polarization is generally lower than the dielectric constant of the ceramic element 10 with polarization at the same temperature. The slope of the temperature characteristic of the dielectric constant, however, is substantially the same regardless of the presence or the absence of the polarization. Thus it can be known that since the temperature measurement by the ceramic element 10 according to the present invention utilizes the slope of the temperature characteristic of the dielectric constant as described above, and is not affected by the absolute values of the dielectric constant, and hence, a suitable characteristic as a temperature detecting element can be obtained regardless of the presence or the absence of the polarization.

Reduction of Curie Point Temperature

Lastly, the reduction of the Curie point temperature will be described. In the present invention, further in the heating up of the domain recreating process, the ceramic element 10 is maintained at the temperature equal to or higher than the Curie point temperature for the predetermined time period so that the distortion or the like generated at the polling process is removed. Hence, when the ceramic element 10 with a low Curie point temperature is employed, the temperature which is required to be reached in the heating up can be lowered and the time necessary for the heating up can be shortened, whereby the overall time required for the domain recreating process can be reduced. The reduction of the Curie point temperature of the ceramic element 10 for such purpose will be described below.

FIG. 17 shows a relation between the additive to the ceramic element 10 and the Curie point temperature. Here it is assumed that $Pb(Mg_{1/3}Nb_{2/3})O_3$ is doped as an impurity into lead titanate ($PbTiO_3$) which is one of perovskite-like crystals. When the additive rate of the impurity is represented as "x," the structure of lead titanate can be expressed as "$(1-x) \times Pb(Mg_{1/3}Nb_{2/3})O_3 - x \times PbTiO_3$". Here, as shown in FIG. 17, the additive rate x and the Curie point temperature Tc are in a proportional relation, and the Curie point temperature Tc can be lowered by the decrease in the additive rate x.

Here, as the Curie point temperature Tc becomes lower, the temperature required during heat treatment in the domain recreating process as a whole can be lowered and the time required for the domain recreating process can be shortened accordingly. In view of required time amount alone, it is preferable to lower the Curie point temperature as far as possible. Along with the change in the Curie point temperature Tc, however, the slope of the temperature characteristic of the dielectric constant also changes. Hence, for the optimization of the slope, the Curie point temperature Tc is preferably adjusted to a fixed level.

FIG. 18 shows a relation between the Curie point temperature Tc and the relative permittivity $\in$. FIG. 18 shows temperature characteristic curves a to e obtained when the additive rate x of impurity doped to the lead titanate ($PbTiO_3$) of the same structure as that in FIG. 17 is changed. Here, in general, the temperature detection range of the heat detector is preferably set to the range from approximately 20 to 60 degrees Centigrade. On the other hand, in the temperature measurement by the heat detector, the use of a range where the slope of the temperature characteristic of the dielectric constant is distinct is preferable for the acquisition of a high S/N ratio. Hence, the Curie point temperature Tc is preferably set so that the range where the slope of the temperature characteristic of the dielectric constant is distinct conforms to the range of approximately 20 to 60 degrees Centigrade. Specifically, a suitable temperature characteristic can be obtained in the range from approximately 20 to 60 degrees Centigrade when the additive rate x of the impurity is set to approximately 0.33, and the Curie point temperature Tc is lowered to approximately 170 degrees Centigrade as shown by the temperature characteristic curve e of FIG. 18. When the Curie point temperature Tc is set to a level equal to or lower than approximately 170 degrees Centigrade, the Curie point temperature can be lowered by approximately 30 degrees compared with the Curie point temperature of the PZT-type ferroelectric material 13, i.e., approximately 200 degrees Centigrade. Thus, the decrease in the Curie point temperature Tc contributes to the decrease in the temperature for heat treatment in the domain recreating process as a whole and the reduction in time required for the processing. On the contrary, if the Curie point temperature Tc is extremely low, the temperature to be detected becomes higher than the Curie point temperature Tc of the ferroelectric material. Then the dielectric ceramic makes phase transition to become a paraelectric material from a ferroelectric ceramic, thereby changing its characteristics. To prevent such changes, the Curie point temperature Tc is required to be set to a temperature equal to or higher than the temperature detection range of the heat detector, i.e. equal to or higher than 60 degrees Centigrade.

According to the second embodiment, in the heating up, the ferroelectric ceramic element which is subjected to the polling process and having a high piezoelectric effect is gradually heated up to the temperature equal to or higher than the Curie point temperature of the ferroelectric material provided in the ceramic element, and causes phase transition to turn into the paraelectric material which does not have intrinsic polarization and domains. Further in the cooling down, the ceramic element is cooled down to the temperature below the Curie point temperature, and causes phase transition again to turn into the ferroelectric material having plural domains with intrinsic polarizations of different directions. Thus, even if a force is applied to the ceramic element due to expansion of the surrounding member or the like, the piezoelectric effects generated in the ferroelectric material having the plural domains with intrinsic polarizations of different directions offset with each other, whereby the noises by the piezoelectric effect can be suppressed. On the other hand, since the slope of the temperature characteristic of the dielectric constant is little affected, only the noises attributable to the piezoelectric effects are reduced, whereby a suitable characteristic as the temperature detecting element can be obtained. Further, since the domains are recreated at random so as to stabilize the energy state of the ferroelectric material, complicated residual stress field is not present in the ceramic element, whereby the changes of the dielectric constant over time can be prevented.

Still further, according to the second embodiment, since the dielectric material is maintained at the temperature equal to or higher than the Curie point temperature for a predetermined time period, the distortion or the like generated at the polling process is removed. Hence, the distortion does not affect the phase transition from the paraelectric material to the ferroelectric material at the cooling down, and the domains are formed at random.

Still further, according to the second embodiment, since the Curie point temperature is lowered, the time required for the heating up of the paraelectric material can be shortened and the time required for manufacturing of the heat detecting element can be reduced.

Still further, according to the second embodiment, since the Curie point temperature is set to the range from approximately 60 to 170 degrees Centigrade, the temperature characteristic of the ferroelectric material can be optimized for the heat detecting.

Thus, the first and the second embodiments are described. A specific structure and a method of the present invention, however, can be altered or improved at will within the scope of technical concept of the present invention as recited in the appended claims. The alteration of the present invention will be described below.

On Applicable Field of the Present Invention

The present invention can be applied not only to the heat detector 1 as described above, but also to any devices which sense heat in the monitoring area and raises alarm according to the sensed state, for example, to a heat detector.

On Problems to be Solved and Effect of the Invention

The problems to be solved by the present invention and the effects of the present invention are not limited by the description provided above. The present invention may solve a problem which is not described above, and may exert an effect which is not described above. Further, the present invention may solve a part of the problems described above, and may exert a part of the effects described above. For example, even when the thermal responsiveness of the heat detector 1 does not satisfy a desired level of the thermal responsiveness, if the achieved thermal responsiveness is at least an improvement over the conventional heat detector, an object of the present invention can be deemed to be achieved.

On Heat Detector

The heat detector performs temperature calculation based on the charging time which changes according to the dielectric constant of the ceramic element 10. The implementation of the temperature calculation, however, is not limited to the above-mentioned example, and can be realized based on an oscillating frequency which changes according to the dielectric constant.

Further, though the heat detector of the embodiments is a fixed-temperature-type heat detector which performs temperature calculation based on the charging time which changes according to the dielectric constant, the type of the heat detector is not limited to the one described above, and may be a differential-type heat detector which detects the rate of the temperature rise based on the change rate of the charging time which changes according to the dielectric constant. Further, the heat detector may includes, in addition to the temperature calculating unit 20 that calculates a temperature based on the charging time or the oscillating frequency that changes according to the dielectric constant of the ceramic element 10, a temperature corrector that corrects the temperature based on a pyroelectric current or the like that is generated based on the change rate of the dielectric constant of the ceramic element 10, and a switch that switches over the temperature calculating unit 20 and the temperature corrector.

On Ceramic Element 10

In the second embodiment, PZT-type ceramic is employed as the ferroelectric material 13 forming the ceramic element 10. Here, any ratio of mixture of Zr and Ti can be employed. Further, the PZT-type ceramic may include an additive such as Nb, La, Ca, and Sr. Further, the ferroelectric material 13 forming the ceramic element 10 is not limited to the PZT-type ceramic or the lead titanate ($PbTiO_3$) mentioned above, and can be ferroelectric ceramic that has other perovskite-like crystalline structure such as strontium titanate ($SrTiO_3$), or barium titanate ($BaTiO_3$).

The ferroelectric ceramic forming the ceramic element 10 is advantageous for high hardness. When such advantage is not necessary, a ferroelectric material other than the ceramic may be employed for forming the ceramic element 10. The ferroelectric material 13 other than the ceramic is, for example, high-polymer ferroelectric material such as Polyvinyliden Fluorid (PVDF), or ferroelectric crystal such as glycine sulfate. These ferroelectric materials may be employed to form the ceramic element 10. Thus, even when the ceramic element 10 is formed from a ferroelectric material other than the ferroelectric ceramic, the heat detector 1 can perform the temperature calculation according to the dielectric constant or the change rate of the dielectric constant of the ceramic element 10.

On Domain Recreating Process

In step S101 or in step S102 of the second embodiment, the ceramic element 10 having the ferroelectric material 13 subjected to the polling process is gradually heated up or cooled down. As far as the ferroelectric material 13 and the electrode 12 forming the ceramic element and the adhesiveness of the ferroelectric material 13 and the electrode 12 are not damaged, the ceramic element 10 may be rapidly heated up or rapidly cooled down. Further, step S101 or step S102 of the second embodiment may be realized by insertion of the ceramic element 10 into a heating furnace whose temperature is set equal to or higher than the Curie point temperature or into a cooling bath whose temperature is set below the Curie point temperature. Still further, the ceramic element 10 may be cooled down in step S102 by natural heat dispersion.

Further, in step S101 of the second embodiment, the ceramic element 10 is maintained at the temperature equal to or higher than the Curie point temperature of the ceramic element 10 for the predetermined time period. The maintenance for the predetermined time period is performed for the purpose of removing the distortion or the like generated at the polling process and the phase transition to the paraelectric material 17. When the removal of the distortion is not required, however, or when the distortion can be instantly removed, or when there is little distortion, the cooling down may immediately starts after the heating up of the ceramic element 10 to a temperature equal to or higher than the Curie point temperature without waiting for the predetermined time period for maintaining the ceramic element 10 at the temperature. When the time required for leaving the ceramic element 10 at the temperature equal to or higher than the Curie point temperature is shortened, throughput of the domain recreating process is improved.

Further, some of the ferroelectric material 13 forming the ceramic element 10 may have a paraelectric phase on a low temperature side of a ferroelectric phase. In this case, the ceramic element 10 may be cooled down to a temperature equal to or lower than the Curie point temperature in step S101 of the second embodiment, and may be heated up to a temperature equal to or higher than the Curie point temperature in step S102. In this case, the ceramic element 10 may be maintained at the temperature equal to or lower than the Curie point temperature for a predetermined time period.

Further, in the second embodiment, the ferroelectric material 13 forming the ceramic element 10 is made to cause phase transition to the paraelectric material 17 by the temperature change. The manner to induce phase transition, however, is not limited to the manner described above, and the phase transition to the paraelectric material 17 may be induced by the application of energy such as pressure, or light.

INDUSTRIAL APPLICABILITY

The present invention can improve the thermal responsiveness of a heat sensing unit such as a ceramic element, and realize swift heat detecting.

BRIEF DESCRIPTION OF THE DRAWINGS

FIG. 1 is a functional block diagram of a structure of a heat detector according to a first embodiment;

FIG. 2 is a circuit diagram of a main part of a temperature calculating unit shown in FIG. 1;

FIG. 3 shows a relation between temperature change and a charging time of a ceramic element;

FIG. 4 is a schematic diagram of the ceramic element;

FIG. 5 shows a plan view and a vertical section of the ceramic element or the like in relation with each other;

FIG. 6 shows a relation between Curie point temperature Tc and relative permittivity $\in$;

FIG. 7 shows difference in characteristics in thermal sensitivity according to a thermal time constant;

FIG. 8 shows a relation between thickness of the ceramic element (horizontal axis) and heat capacity as a relative value (vertical axis);

FIG. 9 shows a relation between combined thickness of the ceramic element and an electrode (horizontal axis) and heat capacity as a relative value (vertical axis);

FIG. 10 is a flowchart of a method of manufacturing the ceramic element;

FIG. 11 is a schematic diagram of the ceramic element after the polling process and before the implementation of the method of manufacturing a heat detecting element according to a second embodiment;

FIG. 12 shows changes over time of an output voltage of the ceramic element whose intrinsic polarization is oriented by the polling process;

FIG. 13 is a flowchart of a process sequence of a domain recreating process;

FIG. 14 is a schematic diagram of the ceramic element heated up to a temperature equal to or higher than the Curie point temperature;

FIG. 15 shows changes over time of an output voltage of the ceramic element before and after the domain recreating process;

FIG. 16 shows a relation between the temperature and the relative permittivity before and after the domain recreating process;

FIG. 17 shows a relation between an additive to the ceramic element and the Curie point temperature;

FIG. 18 shows a relation between the Curie point temperature and the relative permittivity;

FIG. 19 is an elevation view of a conventional thermistor-type heat detector; and FIG. 20 is a sectional view of the heat detector shown in FIG. 19 along line A-A.

DESCRIPTION OF REFERENCE NUMERALS 1, 110 heat detector
10 ceramic element
11, 12 electrode
13 ferroelectric material
14 crystal garin
15 domain
16 intrinsic polarization
17 paraelectric material
20 temperature calculating unit
30 storing unit
40 controlling unit
111 sensing-device main body
112 thermistor
113 thermistor guide
R1 to R5 resistor
TR1 to TR3 transistor
IC1 comparator

The invention claimed is:

1. A heat detector that measures temperature in a monitoring area based on a dielectric constant of a ceramic element, wherein
    the temperature in the monitoring area is calculated based on a charging time of the ceramic element where the charging time corresponds to the dielectric constant of the ceramic element,
    the ceramic element has plural domains with different directions of intrinsic polarization generated by domain recreating process,
    a Curie point temperature of the ceramic element is set within a range so that the Curie point temperature has a predetermined relation with a sensitive temperature range of the heat detector, and
    the Curie point temperature of the ceramic element is set within a range so that a neighboring range of the Curie point temperature on a temperature characteristic curve of the ceramic element substantially conforms to the sensitive temperature range.

2. The heat detector according to claim 1, wherein the Curie point temperature of the ceramic element is set above the sensitive temperature range.

3. The heat detector according to claim 1, wherein the Curie point temperature is set within a range of approximately 60 degrees Centigrade to approximately 170 degrees Centigrade.

* * * * *